L. W. EVERSMAN & H. H. HODGES.
BEET HARVESTER.
APPLICATION FILED DEC. 4, 1912.
1,083,927.
Patented Jan. 13, 1914.
3 SHEETS—SHEET 3.
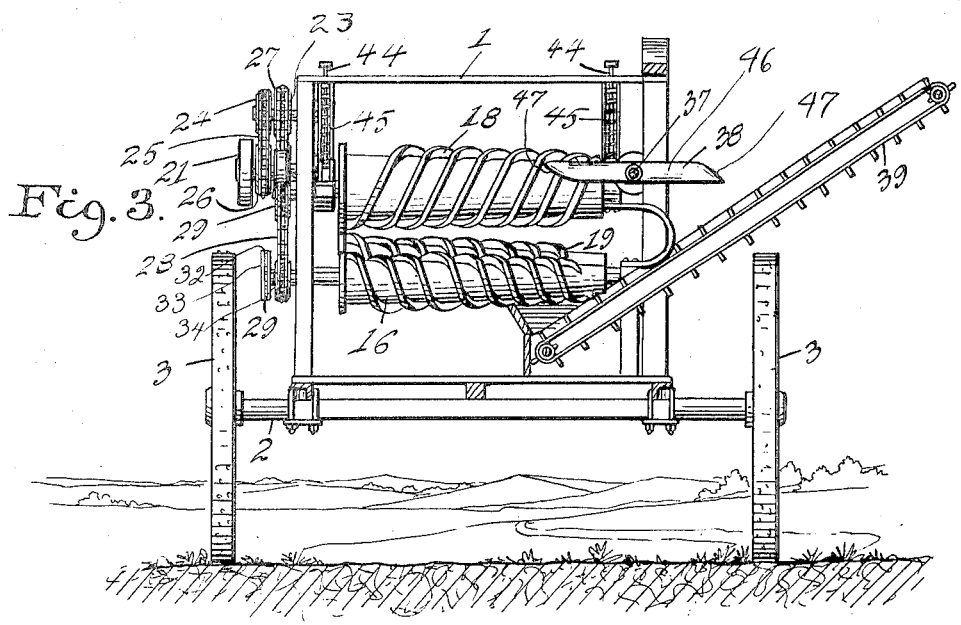
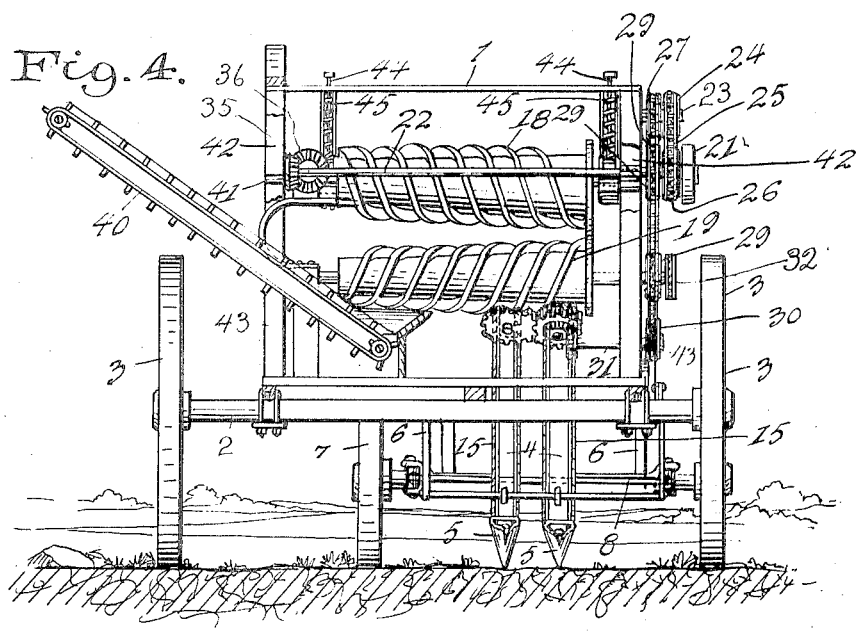
Witnesses
Robert M. Sutphend.
A. L. Hind.
Inventors
L. W. Eversman,
H. H. Hodges.
By Watson E. Coleman
Attorney

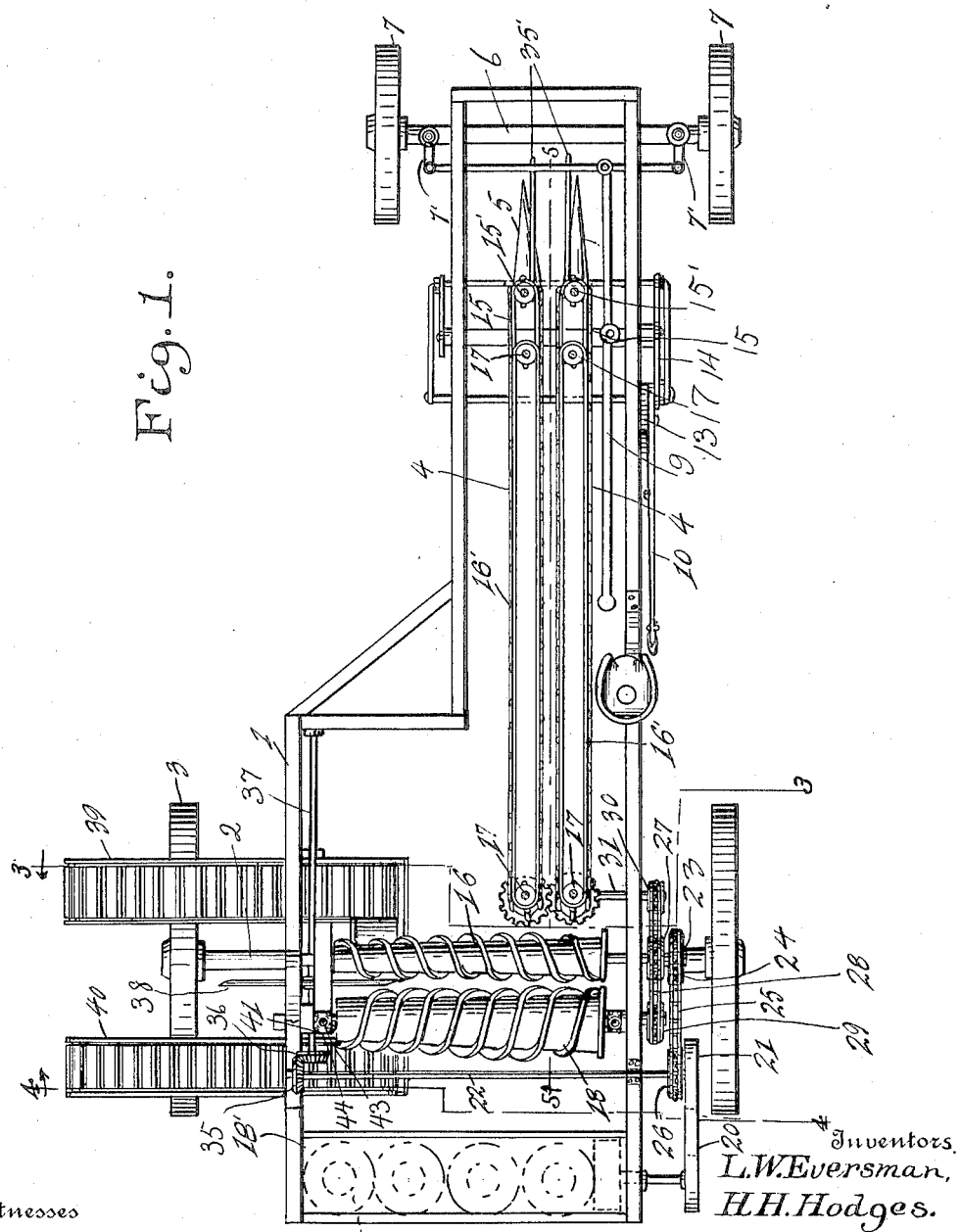

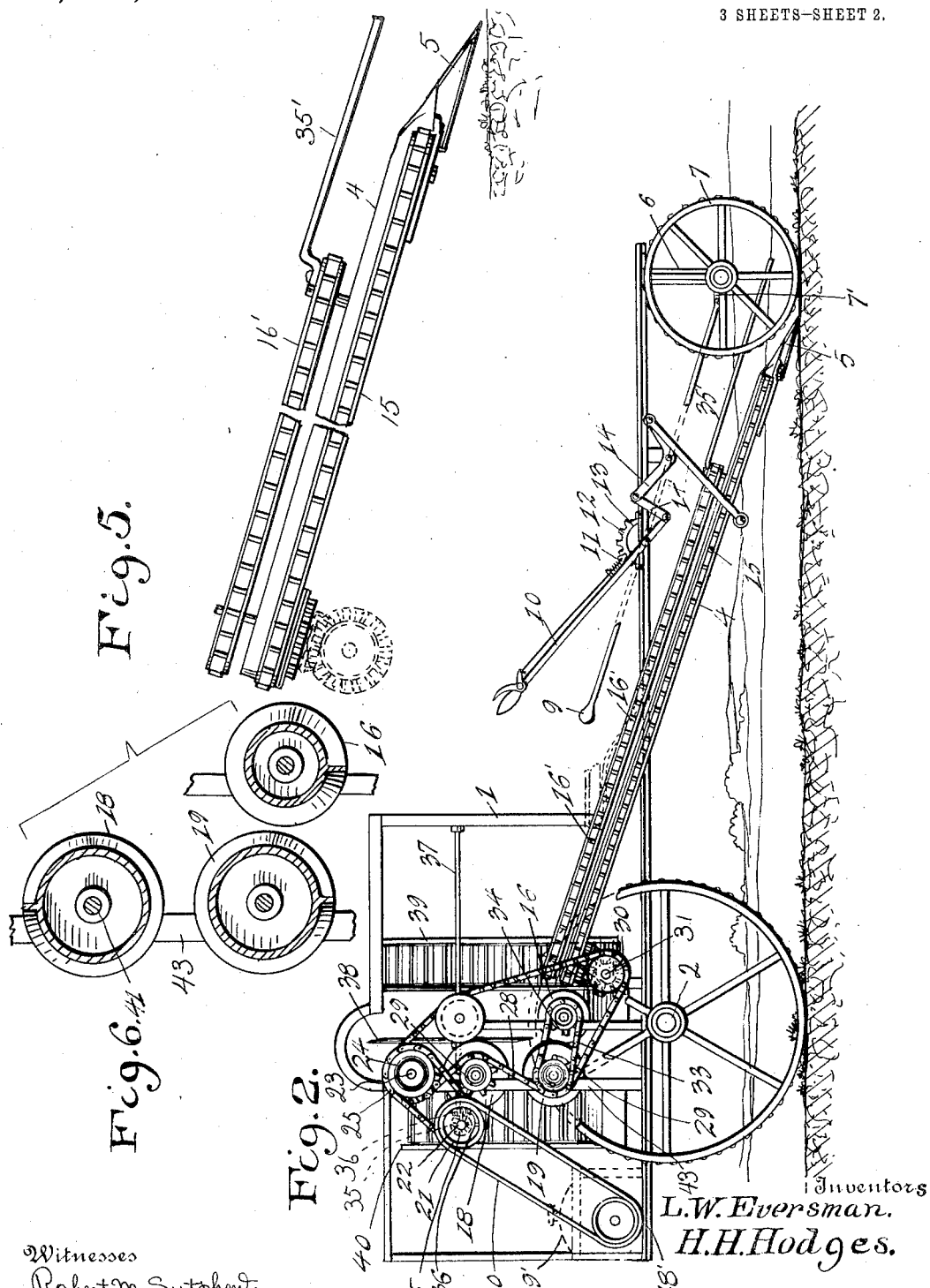

UNITED STATES PATENT OFFICE.

LEWIS W. EVERSMAN AND HENRY H. HODGES, OF JULESBURG, COLORADO.

BEET-HARVESTER.

1,083,927.  Specification of Letters Patent.  Patented Jan. 13, 1914.

Application filed December 4, 1912. Serial No. 734,979.

*To all whom it may concern:*

Be it known that we, LEWIS W. EVERSMAN and HENRY H. HODGES, citizens of the United States, residing at Julesburg, in the county of Sedgwick and State of Colorado, have invented certain new and useful Improvements in Beet-Harvesters, of which the following is a specification, reference being had to the accompanying drawings.

This invention relates to new and useful improvements in agricultural implements.

The object of the invention is to provide a machine of this character which will pull and top beets and deliver the same into a wagon or other vehicle which will be drawn along side of the machine. The vegetables may be delivered on to the ground where they will be picked up later.

Another object of the invention is to provide a machine of this character wherein the operating mechanism is driven entirely independent of the advancement of the machine.

A further object of the invention is to provide a machine of this character which will possess advantages in points of efficiency and durability, is inexpensive to manufacture and at the same time is simple in construction and operation.

With the above and other objects in view, the invention consists in the novel features of construction and the combination and arrangement of parts hereinafter more fully described, pointed out in the claims and shown in the accompanying drawings, in which—

Figure 1 is a top plan view of a machine constructed in accordance with our invention. Fig. 2 is a side elevation. Fig. 3 is a sectional view taken on the line 3—3 of Fig. 1. Fig. 4 is a sectional view taken on the line 4—4 of Fig. 1. Fig. 5 is a sectional view taken on the line 5—5 of Fig. 1, and Fig. 6 is a cross sectional view of the spiral rollers.

Referring more particularly to the drawings, 1 indicates the frame of the machine which is suitably mounted upon the axle 2 having the traction wheels 3 mounted upon each end thereof. Secured to the frame 1 and disposed at an angle with respect thereto are two spaced parallel arms 4, to the lower ends of which are secured the digging points 5. Secured to the frame 1 is a yoke 6. To the lower ends of this yoke are secured the steering wheels 7, said steering wheels being actuated through the medium of the links 7' and the cross bar 8, said cross bar being actuated by means of the steering lever 9.

Pivotally mounted upon the frame 1 is a lever 10 carrying a spring pressed pawl 11 adapted for engagement with the ratchets 12 formed upon the rack 13. The lever 10 is pivotally connected to the arms 4 by means of the bell crank 14 and the links 14' so that the actuation of the lever will raise and lower the digging points 5. Suitable conveyer chains 15 are arranged in parallel relation with the arms 4 and mounted upon the sprockets 15', said chains being adapted to convey the beets or other harvested vegetables to a tapering spiral conveyer roller 16 which is mounted upon the frame 1. Arranged above the conveyer chains 15 and in parallel relation therewith are the chains 16', said chains being mounted upon the rollers 17 and so arranged that they will run more rapidly than the chains 15 so that the top of the beet which is engaged between these chains will be in horizontal relation with the body of the beet by the time the beet reaches the roller 16.

Mounted in the rear of the roller 16 are the superimposed rollers 18 and 19, said rollers being of the spiral type and slightly tapering toward one end thereof so that the beet tops will be quickly and easily conveyed from one side of the frame to the other. A platform 18' extends transversely of the rear of the frame 1 and mounted upon the rear of this platform 18' is an engine 19' which is suitably connected by means of a belt 20 to a pulley 21 which is mounted upon the outer end of the main shaft 22.

Mounted upon the upper end of the framework is a stub shaft 23 upon the outer end of which is mounted a sprocket 24 suitably connected by means of a chain 25 to a sprocket 26 mounted upon the main shaft 22.

Mounted upon the shaft 23 and arranged between the sprocket 24 and the frame 1 is a second sprocket 27 which is suitably connected by means of a chain 28 to the sprockets 29 upon the ends of the rollers 18 and 19 and the sprocket 30 which is mounted upon the outer end of the shaft 31 which operates the conveyer chain 15. From this it will be readily apparent that the conveyer chain 15 and the rollers 18 and 19 are operated through the medium of the main shaft 22.

Mounted upon the outer end of the shaft which supports the roller 19 and arranged between the sprocket 29 and the frame 1 is a second sprocket 32 which is suitably connected by means of a chain 33 to a sprocket 34 which is mounted on the revolving shaft of the roller 16.

Mounted upon the outer end of the shaft 22 opposite the pulley 21 is a beveled gear 35 which is adapted to mesh with a similar gear 36 mounted upon one end of the shaft 37.

Mounted upon the shaft 37 and adapted to revolve therewith is a knife 38, said knife being so arranged that the cutting edge thereof is disposed next to the rollers 18 and 19 between which the tops of the beets are arranged so that as the beets are carried toward one end of the rollers, the tops thereof will be quickly severed from the body of the beet by means of the knife 38.

Projecting forwardly and arranged in parallel relation with the digging points 5 are the guide rods 35' which are adapted to engage the beet tops and direct the same between the conveyer chains 15 and 16'. After the tops of the beets have been removed from the body thereof, the beets are dropped on to the conveyer 39 which carries the same upwardly away from the machine and will either deposit them in a vehicle drawn along side of the machine or drop them on the ground where they will be picked up later. The tops of the beets will drop into the conveyer 40 arranged at the rear of the machine and either be deposited into a vehicle or dropped on to the ground.

The ends of the shaft 41 which supports the roller 18 are yieldingly mounted in the elongated slots 42 formed in the uprights 43 of the frame 1. Vertically disposed rods 44 project downwardly through the top of the frame 1 and are arranged above the bearings of the roller 18.

Mounted upon the rods 44 and arranged between the bearing of the shaft 18 and the top of the frame are the coil springs 45 which normally retain the rollers within the bearings. It will be apparent that when the beet tops are disposed between the rollers 18 and 19, they will be yieldingly held and in case a number of tops be drawn through the rollers, the ends of the shaft upon which the roller is mounted will be allowed to reciprocate within its bearing so, that the roller 18 may be raised and lowered according to the number of tops arranged between the two rollers.

From the above description taken in connection with the accompanying drawings, the operation of the machine will be apparent as follows: The steering wheels 7 upon the advancement of the machine are disposed upon opposite sides of the rows of the vegetables to be dug so that the digging points 5 will be arranged in alinement with the rows so that as the vegetables are raised from the ground, they will be forced back between the conveyer chains 15 and carried back to the topping apparatus. The beets or other vegetables are conveyed upon the roller 16, the tops of the same passing in between the rollers 18 and 19 and upon the rotation of these rollers, the beets will be conveyed to the opposite end thereof where the revolving knife 38 will quickly sever the tops from the body, the body being conveyed by means of the conveyer 39 to a vehicle or other means of receiving the beets while the tops thereof will be conveyed from the machine by means of the conveyer 40. The knife 38 is preferably constructed of an elongated body 46 having the blades 47 formed at each end thereof and disposed in opposite directions.

While we have shown and described the preferred form of our invention, it will be obvious that various changes in the details of construction and in the proportions may be resorted to for successfully carrying our invention into practice without sacrificing any of the novel features or departing from the scope of the appended claims.

What we claim is:

1. In a device of the character described, the combination of a frame, spaced parallel arms projecting outwardly therefrom, digging points carried by said arms, a spiral roller mounted on the frame at the inner ends of said arms, superimposed spiral rollers mounted on the frame and arranged in the rear of the first roller, means for conveying the vegetables to the rollers and means for severing the tops from the vegetables when carried to the opposite end of the rollers.

2. In a device of the character described, the combination of a frame, spaced parallel arms projecting outwardly therefrom, digging points carried by said arms, conveyer chains mounted upon said arms and adapted to convey the vegetables upwardly from the digging points, a spiral roller mounted on the frame at the inner ends of said arms, superimposed spiral rollers mounted on the frame and arranged in the rear of the first roller, means for rotating said rollers to convey the vegetables to the opposite end thereof, and means for severing the tops from said vegetables when they reach the opposite ends of the rollers.

3. In a device of the character described, the combination of a frame, a tapering spiral roller mounted upon said frame, superimposed tapering rollers mounted on the frame in the rear of the first roller, means for digging and conveying the vegetables to said rollers, means for rotating said rollers to convey the vegetables to the opposite end thereof, and means for severing the tops from the vegetables when they reach the opposite ends of the rollers.

4. In a device of the character described, the combination of a frame, a tapering spiral roller mounted upon said frame, superimposed tapering spiral rollers mounted on the frame in the rear of the first roller, one of said second rollers being yieldingly mounted in the frame, means for digging and conveying the vegetables to said rollers, means for rotating said rollers to convey the vegetables to the opposite ends thereof, and means for severing the tops from the vegetables when they reach the opposite ends of the rollers.

5. In a device of the character described, the combination of a frame, a tapering spiral roller mounted upon said frame, superimposed tapering spiral rollers mounted on the frame in the rear of the first roller, said frame having vertical slots formed therein and in which the ends of one of said second rollers are mounted, coil springs bearing on the ends of said rollers to yieldingly hold the same in the lower ends of the slots, means for digging and conveying the vegetables to said rollers, means for rotating said rollers to convey the vegetables to the opposite ends of the rollers and means for severing the tops from the vegetables when they reach the opposite ends of the roller.

6. In a device of the character described, the combination of a frame, a tapering spiral roller mounted upon said frame, superimposed tapering spiral rollers mounted on the frame in the rear of the first roller, one of said rollers being yieldingly mounted in the frame, means for digging and conveying the vegetables to said rollers, an engine mounted on said frame, means for connecting the engine to the rollers to rotate the same and convey the vegetables to the opposite ends of the rollers, a revolving knife mounted on the frame adjacent the second rollers, and means for rotating said knife to sever the tops of the vegetables when they reach the opposite ends of the rollers.

In testimony whereof we hereunto affix our signatures in the presence of two witnesses.

LEWIS W. EVERSMAN.
HENRY H. HODGES.

Witnesses:
WILLIAM M. LABAREE,
JACK WILSON.